United States Patent
Mehrotra et al.

(10) Patent No.: US 10,467,000 B2
(45) Date of Patent: *Nov. 5, 2019

(54) EXTENDING THE USAGE OF INTEGRATED PORTALS FOR A BETTER USER EXPERIENCE

(71) Applicant: International Business Machines Corporation, Armonk, NY (US)

(72) Inventors: Mudit Mehrotra, New Delhi (IN); Girish Padmanabhan, Pune (IN); Rajesh V. Patil, Pune (IN); Prasad P. Purandare, Pune (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/661,231

(22) Filed: Mar. 18, 2015

(65) Prior Publication Data

US 2016/0274901 A1    Sep. 22, 2016

(51) Int. Cl.
| | | |
|---|---|---|
| *G06F 8/70* | (2018.01) | |
| *G06F 8/20* | (2018.01) | |
| *G06Q 10/10* | (2012.01) | |
| *G06F 8/60* | (2018.01) | |
| *G06F 11/30* | (2006.01) | |
| *G06F 11/34* | (2006.01) | |

(52) U.S. Cl.
CPC ............... *G06F 8/70* (2013.01); *G06F 8/20* (2013.01); *G06F 8/60* (2013.01); *G06F 11/30* (2013.01); *G06F 11/3438* (2013.01); *G06F 11/3476* (2013.01); *G06Q 10/101* (2013.01); *G06F 2201/865* (2013.01); *G06F 2201/875* (2013.01)

(58) Field of Classification Search
CPC ..... G06F 8/70; G06F 8/20; G06F 8/60; G06F 11/30; G06F 11/3438; G06F 11/3476; G06F 2201/875; G06F 2201/865; G06Q 10/101
USPC .......................................................... 717/102
See application file for complete search history.

(56) References Cited

U.S. PATENT DOCUMENTS

| | | | | |
|---|---|---|---|---|
| 6,052,730 A | * | 4/2000 | Felciano ............. | G06F 11/3476 709/203 |
| 6,622,179 B2 | | 9/2003 | Welder | |
| 7,870,535 B2 | * | 1/2011 | Rippert, Jr. ............... | G06F 8/20 717/100 |
| 8,468,164 B1 | * | 6/2013 | Paleja ............... | G06F 17/30867 707/767 |

(Continued)

OTHER PUBLICATIONS

Diaz et al, "Improving Portlet Interoperability Through Deep Annotation", [Online], 2005, pp. 372-381, [Retrieved from internet on Jun. 24, 2019], (Year: 2005).*

(Continued)

*Primary Examiner* — Ziaul A Chowdhury
*Assistant Examiner* — Zengpu Wei
(74) *Attorney, Agent, or Firm* — Stephen R. Yoder

(57) ABSTRACT

Decision making for custom portal developments is automated by the collection of product usage logs and analysis of the data collected to determine whether to create a native portlet for the product, and whether the portlet is to have multi-channel capability. Product usage logs include user interaction with the product and the type of traffic coming to the site. The recommended action is based on the analysis of log data with respect to specified key parameters.

14 Claims, 3 Drawing Sheets

(56) References Cited

U.S. PATENT DOCUMENTS

| | | | |
|---|---|---|---|
| 8,479,024 B2 | 7/2013 | Vichare et al. | |
| 8,626,908 B2 | 1/2014 | Wilson et al. | |
| 8,635,590 B1 | 1/2014 | Ogilvie | |
| 8,640,093 B1* | 1/2014 | Gill | G06F 9/44 |
| | | | 717/120 |
| 8,924,942 B1* | 12/2014 | Makuch | G06F 9/44 |
| | | | 715/762 |
| 9,239,717 B1* | 1/2016 | Alsaeed | G06F 11/3688 |
| 9,342,330 B2* | 5/2016 | Pohlmann | G06F 9/455 |
| 2002/0143822 A1* | 10/2002 | Brid | G06F 17/30905 |
| 2003/0004982 A1* | 1/2003 | Brandon | G06Q 10/06 |
| | | | 715/201 |
| 2003/0192036 A1* | 10/2003 | Karkare | G06F 11/3466 |
| | | | 717/158 |
| 2005/0043978 A1 | 2/2005 | Chainer et al. | |
| 2006/0242638 A1 | 10/2006 | Lew et al. | |
| 2007/0185927 A1* | 8/2007 | Chess | G06F 17/3089 |
| 2009/0007067 A1* | 1/2009 | Hepper | G06F 9/4443 |
| | | | 717/115 |
| 2010/0318649 A1* | 12/2010 | Moore | G06F 11/30 |
| | | | 709/224 |
| 2011/0225480 A1* | 9/2011 | Goldband | G06F 17/30887 |
| | | | 715/205 |
| 2011/0276893 A1 | 11/2011 | Yambal et al. | |
| 2012/0079108 A1* | 3/2012 | Findeisen | G06F 11/3419 |
| | | | 709/224 |
| 2012/0197680 A1 | 8/2012 | Zircher, IV et al. | |
| 2012/0197718 A1* | 8/2012 | Martchenko | G06Q 30/02 |
| | | | 705/14.53 |
| 2013/0125143 A1* | 5/2013 | Kikuchi | G06F 11/3438 |
| | | | 719/318 |
| 2013/0212101 A1* | 8/2013 | Okuno | G06F 17/30283 |
| | | | 707/736 |
| 2013/0232463 A1* | 9/2013 | Nagaraja | G06F 8/61 |
| | | | 717/101 |
| 2013/0254373 A1* | 9/2013 | Cockrell | G06F 11/3495 |
| | | | 709/224 |
| 2013/0283241 A1* | 10/2013 | Krajec | G06F 11/3636 |
| | | | 717/128 |
| 2013/0346917 A1 | 12/2013 | Bragdon et al. | |
| 2015/0089354 A1* | 3/2015 | Abrahami | G06F 17/3089 |
| | | | 715/235 |
| 2015/0135160 A1* | 5/2015 | Gauvin | H04W 4/21 |
| | | | 717/109 |
| 2015/0186132 A1* | 7/2015 | Oliveri | G06F 8/34 |
| | | | 717/120 |
| 2015/0215370 A1* | 7/2015 | de la Chevrotiere | H04L 67/02 |
| | | | 709/203 |

OTHER PUBLICATIONS

Yang et al, "An Integrated Shopping Portal Based Recommendation across Web Storefronts: Architecture and Management", [Online], 2009, pp. 58-61, [Retrieved from internet on Jun. 24, 2019], (Year: 2009).*

Serenko et al, "A Model of User Adoption of Mobile Portals", [Online], 2004, pp. 69-98, [Retrieved from internet on Jun. 24, 2019], (Year: 2004).*

Appendix P "List of IBM Patents or Patent Applications Treated as Related"; dated Mar. 9, 2015; pp. 2.

U.S. Appl. No. 15/063,547 entitled "Extending the Usage of Integrated Portals for a Better User Experience" filed Mar. 8, 2016.

Boz, "Building and testing at Facebook", Facebook, Wednesday, Aug. 8, 2012 at 8:48am, 3 pages, <https://www.facebook.com/notes/facebook-engineering/building-and-testing-at-facebook/10151004157328920>.

O'Reilly, "Girish Patangay keynote Velocity Europe 2012 Move Fast and Ship Things", YouTube, Published on Oct. 3, 2012, 3 pages, <https://www.youtube.com/watch?v=rSILB_kl1mw>.

Siegler, MG, "The Next 6 Months Worth of Features Are in Facebook's Code Right Now (But We Can't See)", TechCrunch, Posted May 30, 2011, 6 pages, <https://techcrunch.com/2011/05/30/facebook-source-code/>.

\* cited by examiner

USER ACCESS (H/M/L) - HIGH / MEDIUM / LOW
PERFORMANCE (H/M/L) - HIGH / MEDIUM / LOW
ACCESS BY DEVICE TYPE (CLIENT 104, DESKTOP; CLIENT 106, SMART PHONE; CLIENT 108, TABLET)

| WEB APPLICATION | USER ACCESS (H/M/L) | CURRENT PERFORMANCE (H/M/L) | USER ACCESS BY DEVICE TYPE (CLIENT SUB-SYSTEM) | DECISION 1 - REPLACE WITH NATIVE PORTLET (Y/N) | DECISION 2 - NEED TO ADD MULTI-CHANNEL CAPABILITY (Y/N) |
|---|---|---|---|---|---|
| 401 | H | L | 104,106,108 | Y | Y |
| 402 | M | M | 104,106,108 | N | Y |
| 403 | L | H | 104 | N | N |
| 404 | M | L | 104,108 | Y | N |
| 405 | H | H | 104,106,108 | Y | Y |

EXTENDING THE USAGE OF INTEGRATED PORTALS FOR A BETTER USER EXPERIENCE

BACKGROUND

The present invention relates generally to the field of data management, and more particularly to integrated portals.

An enterprise portal, also known as an enterprise information portal (EIP), is a framework for integrating information, people, and processes across organizational boundaries. Enterprise portals provide a secure unified access point, often in the form of a web-based user interface, and are designed to aggregate and personalize information through application-specific portlets.

It is known to provide for customization for a portal user. That is, users can customize the look and feel of their environment. Customers who are using EIPs can edit and design their own web sites, which are full of their own personality or style. Further, the customer can choose the specific content and services they prefer. EIPs provide for the ability to prioritize most appropriate content based on attributes of the user and metadata of the available content. It is also known to provide for personalization for a portal user. Personalization is more about matching content with the user. Based on a user profile, personalization uses rules to match the "services", or content, to the specific user. To distinguish these two portal features, customization is in hands of the end user, while personalization is not. Of course, actual personalization is often based on the user's role or job function within the portal context.

Portal software is a type of development tool used to create a portal (starting point) on a company's intranet so that employees can find a centralized starting place for access to consolidated enterprise-related functions, such as e-mail, customer relationship management (CRM) tools, company information, workgroup systems, and other applications.

Software products and applications are being developed with more and more features and with increasing complexities. Development teams also spend a lot of time to get the product exactly right the first time. There is a lot of research done to try and get the correct requirements before designing.

SUMMARY

According to an aspect of the present invention, there is a method, computer program product, and/or system for product development planning that performs the following steps (not necessarily in the following order): (i) deploying a first application in a production environment; (ii) collecting, from a first application log, a usage dataset representing a period of usage of the first application in the production environment; (iii) determining a pattern of user interactions based on the usage dataset; and (iv) recommending a custom portal development action based on the pattern of user interactions.

BRIEF DESCRIPTION OF THE DRAWINGS

FIG. 4 is a screenshot view generated by the first embodiment system.

DETAILED DESCRIPTION

Figure 1:
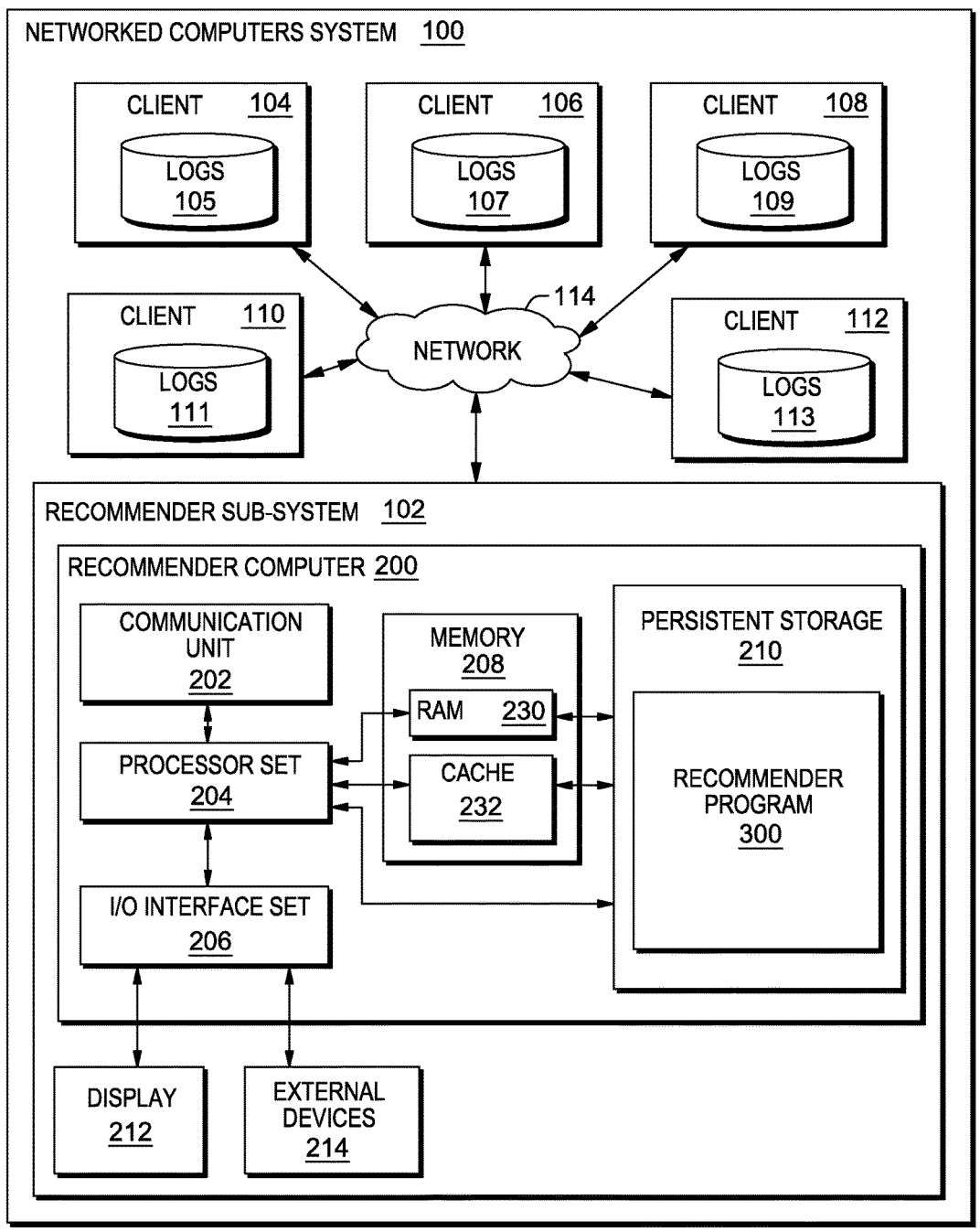
FIG. 1 is a block diagram view of a first embodiment of a system, according to the present invention.

Decision making for custom portal developments is automated by the collection of product usage logs and analysis of the data collected, to determine whether to create a native portlet for the product and whether the portlet is to have multi-channel capability. Product usage logs include user interaction with the product and the type of traffic coming to the site. The recommended action is based on the analysis of log data with respect to specified key parameters. This Detailed Description section is divided into the following sub-sections: (i) The Hardware and Software Environment; (ii) Example Embodiment; (iii) Further Comments and/or Embodiments; and (iv) Definitions.

I. THE HARDWARE AND SOFTWARE ENVIRONMENT

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods, according to the present invention will now be described in detail with reference to the Figures. FIG. 1 is a functional block diagram illustrating various portions of networked computers system 100, including: recommender sub-system 102; client sub-systems 104, 106, 108, 110, and 112; client logs 105, 107, 109, 111, and 113; communication network 114; recommender computer 200; communication unit 202; processor set 204; input/output (I/O) interface set 206; memory device 208; persistent storage device 210; display device 212; external device set 214; random access memory (RAM) devices 230; cache memory device 232; and recommender program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage, and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data) on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either, or both, physical and wireless communications links. Any software modules discussed herein may be downloaded to a persistent storage device (such as persistent storage device 210) through a communications unit (such as, communications unit 202).

I/O interface set 206 allows for input and output of data with other devices that may be connected locally in data communication with computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and, thus, the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

II. EXAMPLE EMBODIMENT

Figure 2:
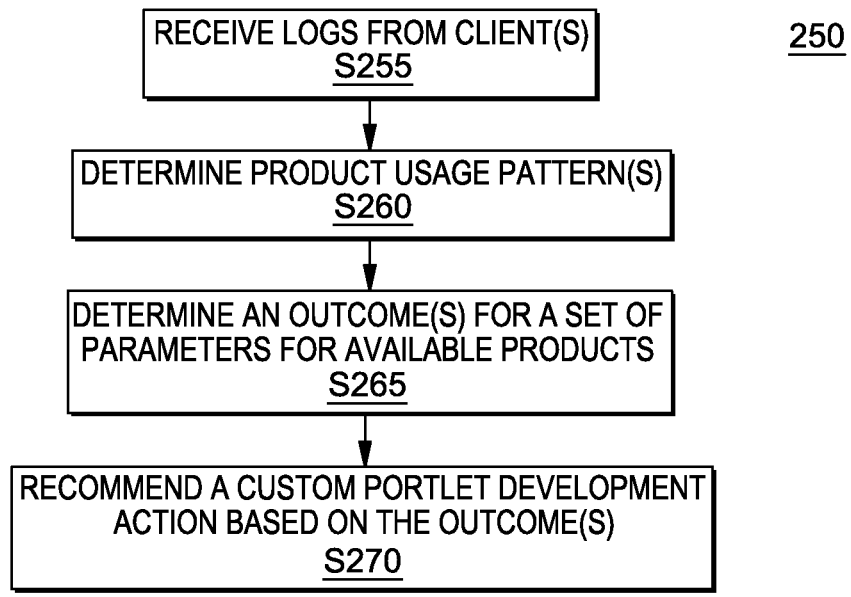
FIG. 2 is a flowchart showing a first embodiment method performed, at least in part, by the first embodiment system.
Figure 3:
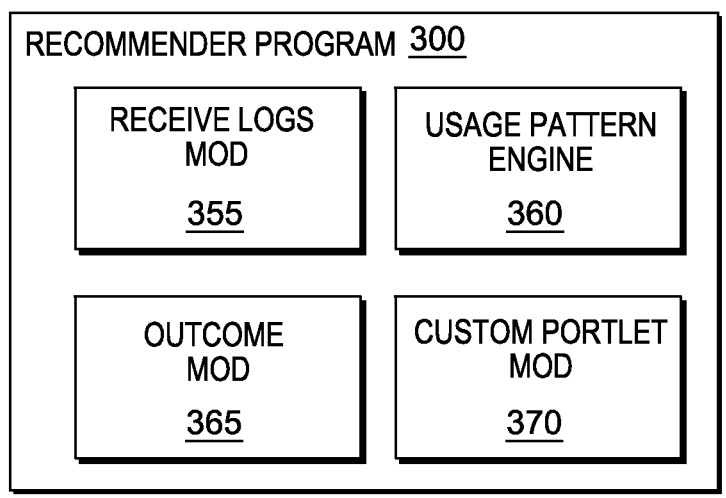
FIG. 3 is a block diagram view of a machine logic (for example, software) portion of the first embodiment system.

FIG. 2 shows flowchart 250 depicting a method, according to the present invention. FIG. 3 shows program 300 for performing at least some of the method steps of flowchart 250. This method and associated software will now be discussed, over the course of the following paragraphs, with extensive reference to FIG. 2 (for the method step blocks) and FIG. 3 (for the software blocks).

An example follows to support understanding of the function of an embodiment of the present invention. FIG. 4 is screenshot 400 showing recommendation output according to the example. According to this example, web application 401 is used by each of client sub-systems 104, 106, and 108. Also presented in screenshot 400 are web applications 402, 403, 404, 405; client sub-system 104 (desktop); client sub-system 106 (smartphone); and client sub-system 108 (tablet).

Processing begins at step S255, where receive logs module ("mod") 355 receives product usage logs from connected clients, such as clients 104, 106, 108, 110, and 112. Product usage logs include: (i) user interactions with the product; (ii) the type of traffic coming to the site; and (iii) two-variant (A/B) randomized testing results. Log data includes: (i) product usage frequency; (ii) feature type(s); and (iii) total time using a particular feature. To support analytics steps that follow, feature types include: (i) important; (ii) productive; (iii) optional; (iv) high power usage; and/or (v) high memory usage. As stated above, in this example, each listed client sub-system interacts with web application 401. The individual logs 105, 107, and 109 for the past two weeks are collected by receive logs mod 355. These logs include data indicating a level of usage by the three sub-systems. Alternatively, logs are collected at other time periods, such as quarterly (every three months) or annually.

Processing proceeds to step S260, where usage pattern engine 360 determines product usage patterns with respect to a set of predetermined usage parameters. The usage pattern engine is an analytics engine that extracts usage patterns from the product usage logs. Usage patterns, for a given period of time, that may be identified from the product usage logs include: (i) the level of user access; (ii) the level of product performance; (iii) the type of device(s) used for accessing the product; (iv) the content, or pages, accessed; (v) time zone based usage; (vi) geographic location based usage; and/or (vii) user-language based usage. In this example, the usage patterns for application 401 are analyzed for usage patterns associated with the specified parameters "user access," "current performance," and "user access by device type."

Processing proceeds to step S265, where outcome mod 365 identifies a set of outcomes for selected key parameter(s) for products available to the client(s). In this example, the key parameters are output for application 401 as: (i) high user access; (ii) low current performance; and (iii) multiple devices being used to gain access to the product (each client sub-system 104, 106, 108, according to FIG. 4, is a different device type). These specific outcomes are the basis for making a portal development recommendation. Alternatively, more parameters are considered when making a portal development recommendation. Other parameters may arise by: (i) the emergence of a new kind of content access and/or navigation paradigm; (ii) organizational content access requirements; (iii) social content access requirements; (iv) governmental content access requirements; (v) legal requirements associated with content access; and/or (vi) changes to navigation standards. Alternatively, a different combination of parameters, or only one parameter, is the basis for making a portal development recommendation.

Processing proceeds to step S270, where custom portlet mod 370 recommends a custom portlet development action based on the identified outcome(s). As shown in FIG. 4, the recommendation for web application 401 is to replace the current access type with a native portlet and to provide for multi-channel capability in the native portlet. The recommended action is based on pre-determined results for specified parameters. For example, in FIG. 4, web applications 404 and 405 are each accessed by multiple devices, but only application 405 is recommended for adding multi-channel capability. This is, in part, because of the result of the user access parameter, where application 404 is rated "medium" and application 405 is rated "high." The high use rating of application 405, along with access by three different devices, 104, 106, and 108 trigger the recommendation of multi-channel capability. Application 404, on the other hand, is only moderately used by only two different devices, 104 and 108, so the recommendation is not provide for multi-channel capability. Again, the recommendation is based on the outcome of the analysis, but also in light of pre-determined conditions that trigger the recommendation to take a custom portlet development action, such as Decision 1, replace with native portlet, and Decision 2, add multi-channel capability. In this example, each decision is made independent of the other decisions. Some embodiments of the present invention have cascading decisions, such that a first decision to take a positive action triggers consideration of making a second decision.

III. FURTHER COMMENTS AND/OR EMBODIMENTS

Some examples follow to provide a better understanding of the utility and/or implementation of some embodiments of the present invention. Web application products, being bulky due to loads of features, oftentimes end up with performance degradation as a trade-off. Oftentimes a number of product features are not being used by many users. The reasons for no use vary and include: (i) no need for the feature; (ii) do not know about the feature; and (iii) there is no time to use the feature. Most of the web application products maintain older features with a new version for backward compatibility.

Another use case is where an enterprise wants to standardize their existing heterogeneous web infrastructure. Conventional portal systems provide the capability for the enterprise to achieve this goal; however, it needs investment of money and time upfront. Conventional web application components reduce this upfront cost by allowing native web-based user interface integration with minimum investment and without removing the existing infrastructure already invested in. These web application components are just the starting point of the enterprise's digital experience evolution because it does not provide a complete native portal experience, and the corresponding capabilities that some applications require. The final operating environment in such a scenario is a hybrid mix of back-end integration into portal through the web application component, as well as some custom portlets.

Some embodiments of the present invention predict the right hybrid mix to ensure that an optimum investment can be made in the development of the right amount of custom portlets for redesigning the digital experience.

Some embodiments of the present invention recognize the following facts, potential problems, and/or potential areas for improvement with respect to the current state of the art: (i) there is a need to understand user behavior and preference over a prolonged usage of the product or application so that the development teams can continue to refine and improve the quality, usage scenarios, and design of the application or product; (ii) when a product is released, it has been observed that not all expectations and needs of the users are met, even when the product is a new version of the same product; (iii) there is a clear need to come up with a mechanism that provides for better predictability of user needs; (iv) user needs can be leveraged by organizations to plan better investment in product and application development; (v) among all the web application development platforms and mechanisms, developing new applications for portals is the most time consuming and complex; (vi) organizations use web application components to hasten their migration process from previous practices where they had to port everything upfront before rolling out a portal system; and (vii) currently, organizations first roll out the portal system and then plan on porting applications.

Referring to FIG. 4, recommendation are made based on the matrix created using any analytics tool. In that way, the organization decides where to enhance their user's experience in order to help them more and where to let the current design stay as it is because any improvement would not provide the necessary incremental benefit. Costs are a major factor in deciding when to enhance the user's experience. With respect to the two decision in FIG. 4, considerations for establishing a native portlet include the enhanced user experience required and restrictions on some data or content being displayed that require a new portlet to be constructed. Also, multi-channel capability is influenced by looking at the devices being used for access or the launch of new kind of content access mechanisms which may be unknown at this time but may emerge and would make it easier to access or navigate through web content.

Some embodiments of the present invention identify patterns of user interactions with the application through the logs by applying analytics algorithms. An indicative (not complete by any means) list of patterns that may be unearthed would be in terms of user interaction scenarios, type of user traffic coming to the site, some A/B testing scenarios, etc.

Some embodiments of the present invention automate the identification of patterns "on the fly" for the investment side of creating custom portlets. A generic formula is created to estimate the investment factor required according to the workflow of the existing application that may be replaced by the custom portlet.

Some embodiments of the present invention are directed to a multi-step process that moves from an old system to a new system, then from the new system to a hybrid system. The hybrid system is the one used for reviewing, for example product usage patterns, and for finalizing the custom building candidates for the new system. The hybrid system can also be called a Day One replacement solution.

When an organization needs to move to a new platform, they would need to make sure all the applications available on the old platform are also available in the new platform. This would involve the cost of porting "all" the applications irrespective of their being used by the users or not, which would clearly be sub-optimal.

Some embodiments of the present invention are directed to a way to make this transition highly optimized with steps including: (i) allowing the user(s) switch to the new platform immediately; (ii) requiring little or no modification of existing application code; (iii) using, by the user(s), whatever applications are available on the new platform; (iv) using, by the user(s), the rest of the applications by accessing to the old system through any frame-based access mechanism that provides a window from the old platform to the new platform; (v) enabling a logging mechanism that captures application-specific usage patterns for applications being accessed remotely; and (vi) depending on these usage patterns, the organization decides when applications are actually ported to the new platform. In this way, investment on the porting activity is optimal and provides the best return on investment.

In some embodiments of the present invention, the mechanism to log the interactions is created not at the older platform, but is a part of the new platform interface. Accordingly, irrespective of the whether the older platform and/or applications are developed to capture the interaction data, the interaction data is captured. The collection of the interactions on the new platform level further minimizes disruptions because there is a higher risk associated with modifying the existing and stable applications than developing something as a part of new platform and/or application.

Some embodiments of the present invention provide a logging mechanism to identify, based on product usage, which device is primarily used to access an application. This usage information is used, in some embodiments, to create a platform-specific and/or device-specific version of the web application.

Some embodiments of the present invention combine the data collection required for porting with an evolved approach to migration starting with a first cut, almost immediate, migration along with a mechanism to resolve the potential problem of whether or not the older system is already amenable for logging of interactions.

Some embodiments of the present invention are helpful and targeted at web applications where an enterprise may want to switch from a .Net based deployment to a conventional portal-based deployment. Inline frame (iframe) based components readily provide a proved method for accessing a web application running one system from another system. Web application components may also provide a mechanism to add logic to the iFrame that allows logging of interactions on the portal server running on the front end for any access to the web application being accessed through it.

Some embodiments of the present invention address the scenario where a web application is migrated to a new infrastructure or a web-container in the beginning of the process. Using an iframe, the older application is rendered on the new web-container and then the data gather commences. According to some embodiments of the present invention, users do not need to wait for the other benefits the new infrastructure provides. This is specific to the case where an enterprise is evolving or moving from one web platform to another. The reason why an enterprise would do that is to take advantage of what the new platform offers. However, the enterprise cannot use the new platform immediately because it has to wait while all the existing applications from the older platform are migrated to the newer one.

In some embodiments of the present invention, the new infrastructure is rolled out while keeping the older infrastructure intact and running the older applications. The applications are rendered on the new environment inside an iframe, thus ensuring that the users can continue to access the application uninterrupted, take advantage of the other features that the new environment provides without waiting for all the web applications to first migrate on it, and add a small module to collect access traces in order to come up with the features that are highly utilized, only migrating those applications to the new platform. This method maximizes the consumption of the functions and features of the new platform while keeping those applications which are used less, or otherwise determined to not migrate, on the same old platform and continue to render it through an iframe.

Some embodiments of the present invention automatically identify usage patterns and corresponding data for key parameters on the fly. The identification of patterns can even be automated "on the fly" for the investment aspects of creating custom portlets by creating a generic formula to estimate the investment factor required for establishing the custom portlet. The investment factor may be based on the workflow of existing application(s) that may be replaced by the custom portlet.

Some embodiments of the present invention may include one, or more, of the following features, characteristics, and/or advantages: (i) provides a precise and predictable analysis of a user's behavior; (ii) allows for a targeted investment in new development and version revisions; (iii) in a web based application, this could be in the form of modifying parts of the existing web application pages and flows, or completely redesigning some parts of the application; (iv) in portal software, this would mean that in case there is a need to move to a new portal based infrastructure, then investment is made in only those areas to develop completely new portal applications or portlets where the impact would be maximum; (v) makes the investment in new portal application more targeted to the consumer; (vi) enhanced predictability of the outcomes of portal application development investments; and/or (vii) saves investment costs for developing applications for both desktop and mobile devices.

Some embodiments of the present invention deploy a new portal infrastructure in a production environment while collecting usage metrics that serve as inputs to product planning, or making recommendations for custom portlet development.

IV. DEFINITIONS

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

User/subscriber: includes, but is not necessarily limited to, the following: (i) a single individual human; (ii) an artificial intelligence entity with sufficient intelligence to act as a user or subscriber; and/or (iii) a group of related users or subscribers.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer program product for product development planning, the computer program product comprising a computer readable storage medium having stored thereon:
   a first program instructions programmed to render a first application in a first production environment within an inline frame architecture to generate a rendered access to the first application in the first production environment, the first application running in a second production environment, the first application being programmed for deployment in the second production environment;
   a second program instructions programmed to collect, from a first application log generated by a mechanism of the first production environment, a usage dataset representing a period of usage of the first application running in the second production environment and accessed in the first production environment via the rendered access within the inline frame, the usage dataset including user access frequency and an identity of a user device accessing the first application during the period of usage;
   a third program instructions programmed to determine a pattern of user interactions corresponding to access of the first application in the first production environment while running in the second production environment based on the usage dataset; and
   a fourth program instructions programmed to recommend development of a platform-specific version of the first application having multi-channel capability for deployment from a native portlet in the first production environment based on the pattern of user interactions with respect to multiple devices being used to gain access to the first application, the platform-specific version of the first application being programmed for deployment in the first production environment without the rendered access within the inline frame;

wherein:
   the first production environment is a target environment to which applications are being migrated from the second production environment; and
   the multi-channel capability based on the pattern of user interactions indicates multiple device usage of rendered access via the inline frame to the first application running in the second production environment.

2. The computer program product of claim 1, having further stored thereon:
   a fifth program instructions programmed to report, for the first application, a pattern outcome for a predetermined set of decision parameters.

3. The computer program product of claim 1, wherein the pattern of user interactions corresponding to access of the first application in the first production environment while running in the second production environment further includes, for the period of usage: application performance via the rendered access within the inline frame.

4. The computer program product of claim 1, having further stored thereon:
   a sixth program instructions programmed to monitor the usage dataset continuously.

5. The computer program product of claim 1, wherein the mechanism of the first production environment for generating the first application log includes the inline frame architecture being configured to record in the first application log interactions in the first production environment where access to the first application occurs through the inline frame architecture.

6. The computer program product of claim 1, wherein:
   the recommending development of the platform-specific version of the first application for deployment from the native portlet in the first production environment is further based on a comparison of the pattern of user interactions with a set of usage parameters;
   the set of usage parameters includes multiple device usage parameters; and
   the comparison indicates that the pattern of user interactions corresponding to access of the first application in the first production environment while running in the second production environment correlates to multiple device usage parameters.

7. The computer program product of claim 1, wherein:
   the recommending development of the platform-specific version is further based on a rating of the first application, the rating being based on how many devices of the multiple devices are used to gain access to the first application.

8. A computer system for product development planning, the computer system comprising:
   a processor(s) set; and
   a computer readable storage medium;
   wherein:
   the processor set is structured, located, connected and/or programmed to run program instructions stored on the computer readable storage medium; and
   the program instructions include:
   a first program instructions programmed to render a first application in a first production environment within an inline frame architecture to generate a rendered access to the first application in the first production environment, the first application running in a second production environment, the first application being programmed for deployment in the second production environment;

a second program instructions programmed to collect, from a first application log generated by a mechanism of the first production environment, a usage dataset representing a period of usage of the first application running in the second production environment and accessed in the first production environment via the rendered access within the inline frame, the usage dataset including user access frequency and an identity of a user device accessing the first application during the period of usage;

a third program instructions programmed to determine a pattern of user interactions corresponding to access of the first application in the first production environment while running in the second production environment based on the usage dataset; and a fourth program instructions programmed to recommend development of a platform-specific version of the first application for deployment from a native portlet in the first production environment based on the pattern of user interactions with respect to multiple devices being used to gain access to the first application, the platform-specific version of the first application being programmed for deployment in the first production environment without the rendered access within the inline frame;

wherein:

the first production environment is a target environment to which applications are being migrated from the second production environment; and the multi-channel capability based on the pattern of user interactions indicates multiple device usage of rendered access via the inline frame to the first application running in the second production environment.

9. The computer system of claim 8, the program instructions further including:

a fifth program instructions programmed to report, for the first application, a pattern outcome for a predetermined set of decision parameters.

10. The computer system of claim 8, wherein the pattern of user interactions corresponding to access of the first application in the first production environment while running in the second production environment further includes, for the period of usage: application performance via the rendered access within the inline frame.

11. The computer system of claim 8, having further stored thereon:

a sixth program instructions programmed to monitor the usage dataset continuously.

12. The computer system of claim 8, wherein the mechanism of the first production environment for generating the first application log includes the inline frame architecture being configured to record in the first application log interactions in the first production environment where access to the first application occurs through the inline frame architecture.

13. The computer system of claim 8, wherein:

the recommending development of the platform-specific version of the first application for deployment from the native portlet in the first production environment is further based on a comparison of the pattern of user interactions with a set of usage parameters;

the set of usage parameters includes multiple device usage parameters; and the comparison indicates that the pattern of user interactions corresponding to access of the first application in the first production environment while running in the second production environment correlates to multiple device usage parameters.

14. The computer system of claim 8, wherein:

the recommending development of the platform-specific version is further based on a rating of the first application, the rating being based on how many devices of the multiple devices are used to gain access to the first application.

* * * * *